(No Model.)
W. D. NAPIER.
TONGUE SUPPORT.
No. 446,152. Patented Feb. 10, 1891.
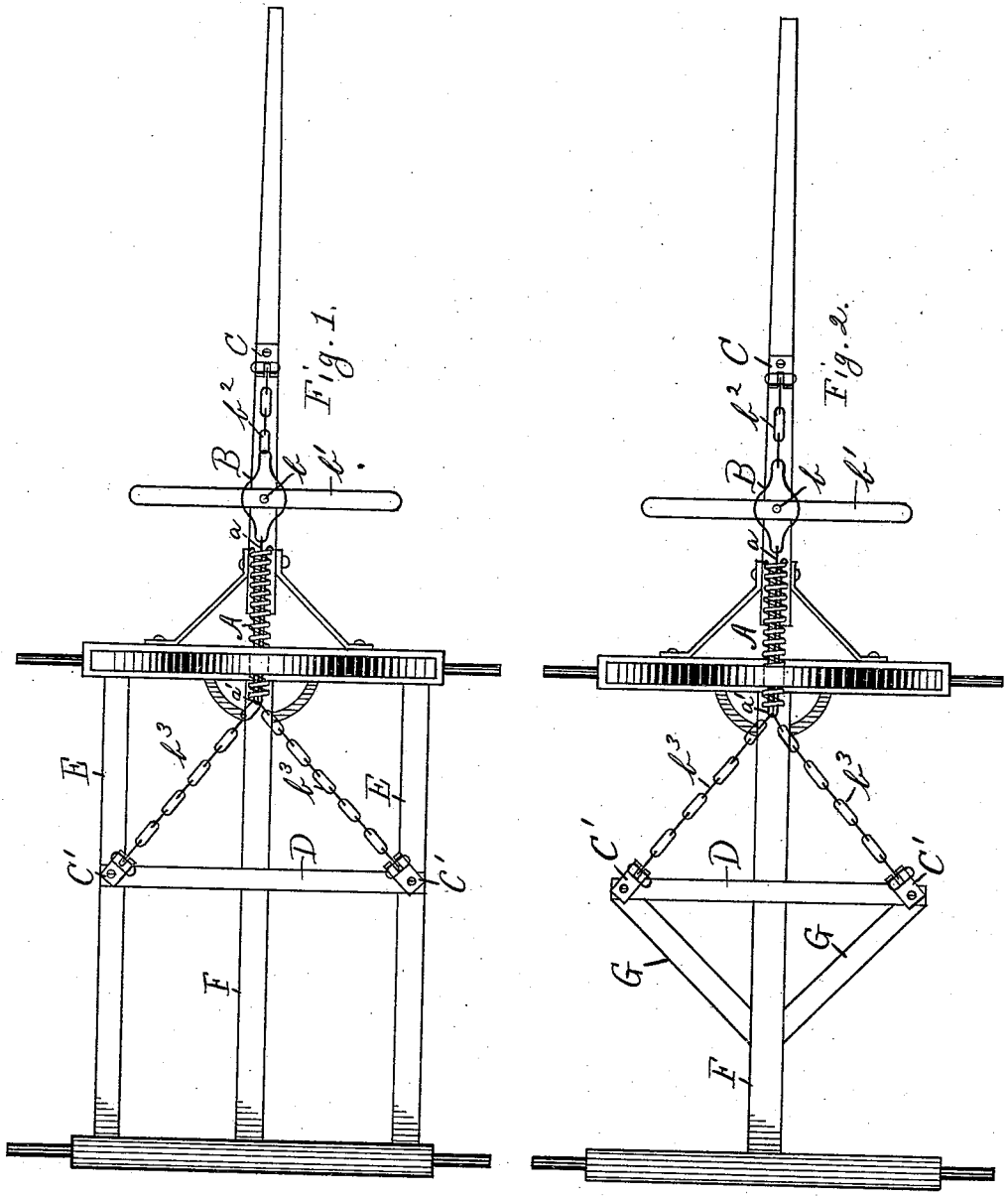
WITNESSES:
G. E. Glascock,
M. E. Lansdale.
INVENTOR
W. D. Napier
BY
John G. Duffie
ATTORNEY.

UNITED STATES PATENT OFFICE.

WILLIAM D. NAPIER, OF MOUNTAIN HOME, ARKANSAS.

TONGUE-SUPPORT.

SPECIFICATION forming part of Letters Patent No. 446,152, dated February 10, 1891.

Application filed November 19, 1890. Serial No. 371,950. (No model.)

*To all whom it may concern:*

Be it known that I, WILLIAM D. NAPIER, a citizen of the United States, residing at Mountain Home, in the county of Baxter and State of Arkansas, have invented certain new and useful Improvements in Tongue-Supports; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to tongue-supports; and it consists in the novel construction and arrangement of its parts.

In the accompanying drawings, Figure 1 is a top elevation of the running-gear of a vehicle with my invention attached thereto. Fig. 2 is a top elevation of a differently-constructed running-gear with my invention attached thereto.

My invention is described as follows:

It consists of the spiral spring A, having the arms $a$ and $a'$ passing through the coil of said spring and having their free ends bent so as to grasp the front and rear ends of said spring.

To the front end of the arm $a$, that grasps the rear end of the spring A, is linked the elongated link B, shaped as shown, so as to surround the pin $b$ of the doubletree $b'$ and not catch on the said pin, as a continuous chain would be likely to do. To the front end of said link is attached a chain $b^2$, the front end of which is caught in a hook C, secure to the tongue of the vehicle. To the rear end of the arm $a'$, that grasps the front end of the spring A, is attached two chains $b^3$ $b^3$, the rear ends of which are secured in the hooks C' C', respectively, which are attached one at each end of the cross-bar D.

My invention has a double purpose: First, it acts as a tongue-support; second, the chains $b^3$, arranged as shown and described, will keep the tongue from having any unnecessary lateral wabbling motion, as when the vehicle is passing over rough ground. The cross-bar D is nearly as long as the vehicle is wide, and when vehicles are used with side bars E, as shown in Fig. 1, said cross-bar may be attached to said side bars; but where such side bars are not used said cross-bar D may be secured to the reach F and to braces G; or said cross-bar may be secured in position by any other substantial means, but should be far enough back from the front axle to give the same free play, and should be long enough to keep the ends of the two chains $b^3$ nearly as far apart as the vehicle is wide.

The hooks C and C' are constructed alike, having the two teeth with a recess between them, so that the chain may be attached to them, as shown, and thus distribute the strain.

The gearing in Fig. 2 is constructed so as to do away with the pieces E in Fig. 1, and thus enable the vehicle to make short turns.

Having described my invention, what I claim as new, and desire to secure by Letters Patent, is—

1. In combination with a running-gear, a tongue-support consisting of a coil-spring A, having attaching-arms to either end, link B, enlarged at its middle, its rear end attached to the front end of said spring and its front end attached to the tongue, chains $b^3$, their front ends secured to the rear end of said spring and their rear ends to either end of the cross-bar D, and cross-bar D, secured to the running-gear.

2. In combination with a running-gear, a tongue-support consisting of the spring A, having the arms $a$ and $a'$, enlarged link B, its rear end linked in the front end of the arm $a$, said link made wide at its middle, so as not to interfere with the bolt $b$, chain $b^2$, its rear end attached to link B and its front end secured in hook C, hook C, secured to the tongue, chains $b^3$, their front ends secured to the rear end of the arm $a'$ and their rear ends secured in the hooks C', hooks C', secured to each end of the cross-bar D, and cross-bar D, secured to the running-gear of the vehicle, substantially as shown and described, and for the purposes set forth.

In testimony whereof I affix my signature in presence of two witnesses.

WILLIAM D. NAPIER.

Witnesses:
C. A. EATMAN,
T. W. NIXON.